(12) United States Patent
Rodgers et al.

(10) Patent No.: US 8,365,308 B2
(45) Date of Patent: Jan. 29, 2013

(54) METHOD AND SYSTEM FOR A SECURE POWER MANAGEMENT SCHEME

(75) Inventors: Stephane Rodgers, San Diego, CA (US); Iue-Shuenn Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1074 days.

(21) Appl. No.: 12/248,146

(22) Filed: Oct. 9, 2008

(65) Prior Publication Data

US 2010/0083387 A1    Apr. 1, 2010

Related U.S. Application Data

(60) Provisional application No. 61/100,587, filed on Sep. 26, 2008.

(51) Int. Cl.
*G06F 21/00* (2006.01)
(52) U.S. Cl. ............................................. 726/34; 726/36
(58) Field of Classification Search ................ 726/36, 726/34; 713/300, 323, 330, 324
See application file for complete search history.

(56) References Cited

U.S. PATENT DOCUMENTS

| | | | | |
|---|---|---|---|---|
| 5,717,934 A * | 2/1998 | Pitt et al. | ................ | 713/330 |
| 6,088,806 A * | 7/2000 | Chee | ................ | 713/322 |
| 6,101,143 A * | 8/2000 | Ghia | ................ | 365/227 |
| 6,654,896 B1 * | 11/2003 | Saunders et al. | ................ | 713/323 |
| 7,039,819 B1 * | 5/2006 | Kommrusch et al. | ........ | 713/322 |
| 2002/0174388 A1 * | 11/2002 | Hommel | ................ | 714/47 |
| 2003/0188066 A1 * | 10/2003 | Kwatra et al. | ................ | 710/260 |
| 2005/0114687 A1 * | 5/2005 | Zimmer et al. | ................ | 713/193 |
| 2006/0005056 A1 * | 1/2006 | Nishioka | ................ | 713/300 |
| 2007/0289019 A1 * | 12/2007 | Lowrey | ................ | 726/24 |
| 2008/0031588 A1 * | 2/2008 | Leung et al. | ................ | 386/83 |
| 2008/0068239 A1 * | 3/2008 | Anderson et al. | ................ | 341/139 |

* cited by examiner

*Primary Examiner* — Edward Zee
*Assistant Examiner* — Chi Nguy
(74) *Attorney, Agent, or Firm* — Sterns, Kessler, Goldstein & Fox PLLC

(57) ABSTRACT

A security processor integrated within a system may be securely shut down. The security processor may receive shut down requests, and may determine components and/or subsystems that need be shut down during shut down periods. The security processor may determine when each of the relevant components is ready for shut down. Once the relevant components are shut down, the security processor may itself be shut down, wherein the shut down of the security processor may be performed by stopping the clocking of the security processor. A security error monitor may monitor the system during shut down periods, and the security processor may be powered back on when security breaches and/or threats may be detected via the security error monitor. The security error monitor may be enabled to power on the security processor by reactivating the security processor clock, and the security processor may then power on the system.

19 Claims, 4 Drawing Sheets

METHOD AND SYSTEM FOR A SECURE POWER MANAGEMENT SCHEME

CROSS-REFERENCE TO RELATED APPLICATIONS/INCORPORATION BY REFERENCE

This patent application makes reference to, claims priority to and claims benefit from: U.S. Provisional Application Ser. No. 61/100,587 filed on Sep. 26, 2008.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to secure processing systems. More specifically, certain embodiments of the invention relate to a method and system for a secure power management scheme.

BACKGROUND OF THE INVENTION

In an increasingly security-conscious world, protecting access to information and/or to systems from unwanted discovery and/or corruption is a major issue for both consumers and businesses. The growth of system connectivity has been one of the major developments in recent years. Fewer and fewer systems are operating as stand-alone devices, and most of today's systems are increasingly becoming elements of complex networks. These systems may comprise processing units, which may be required to perform general processing functions including, but is not limited to, loading code and/or data, performing code validation, executing code instructions, and performing memory manipulations. The growth in networking allows improved performance and increased flexibility.

Because of this growth in system distribution and connectivity, system security, and protection against unwanted access and/or corruption, has become a major concern for systems owners and/or operators since systems in general, and processing units in particular, may be exposed to potential external security threats and breaches attempting to gain access to the systems and/or information and data stored within the systems. To that end, many systems may comprise dedicated security subsystems, which may be utilized to monitor the system security throughout its operations.

In addition to security concerns, power conservation has also become a critical requirement and/or consideration in systems. Use of power savings techniques that enable conserving power has become a focus issue in designing systems and/or their components.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a secure power management scheme, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a secure power management scheme. Aspects of the invention may enable a security processor integrated within a system to be securely shut down without security being compromised. The security processor may receive a shut down request, and may determine components and/or subsystems in the system that need be shut down during the security processor shut down periods. The security processor may determine when each of the relevant components is ready to be shut down, and those ready components and/or subsystems may be shut down accordingly. Once the relevant components are shut down, the security processor may itself be shut down, for example, by stopping the clocking of the security processor. A security error monitor may be enabled to monitor the system during shut down periods, and the security processor may be powered back on, when security breaches and/or threats may be detected via the security error monitor. The security error monitor may be enabled to power on the security processor by reactivating the security processor clock, and the security processor may then power on the system.

Figure 1:
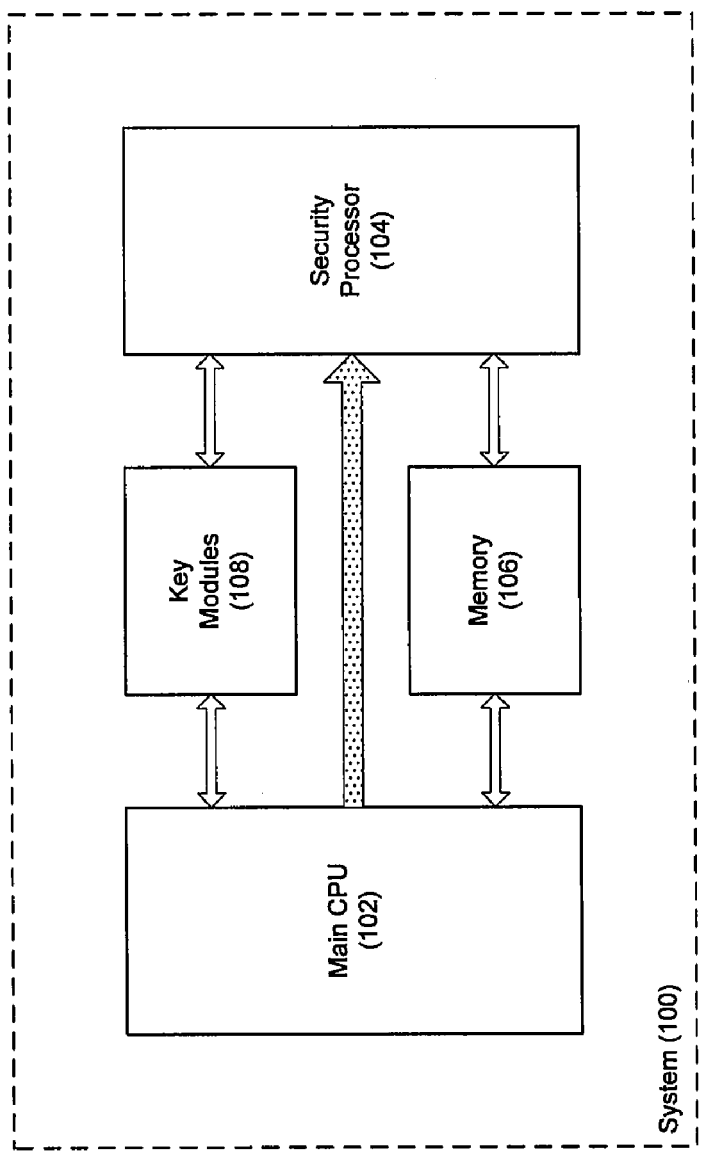
FIG. 1 is a block diagram illustrating an exemplary system that comprises a security processor, which may be utilized in accordance with an embodiment of the invention.

FIG. 1 is a block diagram illustrating an exemplary system that comprises a security processor, which may be utilized in accordance with an embodiment of the invention. Referring to FIG. 1, there is shown a system 100, a main Central Processing Unit (main CPU) 102, a security processor 104, key modules 108, and a memory 106.

The system 100 may comprise the main CPU 102, the security processor 104, the key modules 108, and the memory 106. The system 100 may also comprise suitable logic, circuitry, and/or code that may enable performing various operations, which may comprise data manipulation and/or storage, calculations, enabling inputting and/or outputting of various types of data, and/or performing execution of applications or programs. The system 100 may comprise, for example, a general-purpose computer such as a desktop, a laptop, and/or workstation. Alternatively, the system 100 may comprise a special-purpose computer system that may be optimized for performing a specific type of functionality, for example, a digital television (DTV) set-top box (STB) system-on-chip (SOC). The system 100 may be shut down and/or powered on, to preserve power in the system 100 for example. Alternatively, power preservation may be achieved by, for example, shutting off clock signaling utilized to clock at least some of components in system 100, wherein the shutting off the clocking is performed in a manner that ensures that security of the system 100 may not be compromised during clocking shut off periods.

The main CPU 102 may comprise suitable logic, circuitry and/or code that may enable performing main processing and/or control operations in the system 100. The invention may not be limited to any specific processor, but may comprise for example, a general purpose processor, a specialized processor or any combination of suitable hardware, firmware, software and/or code, which may be enabled to provide secure power management operations in the system 100.

The security processor 104 may comprise suitable logic, circuitry and/or code that may enable performing security operations in the system 100.

The memory 106 may comprise suitable logic, circuitry, and/or code that may enable storage and/or retrieval of data and/or code, which may be utilized by subsystems and/or devices in the system 100, for example, the security processor 102. In this regard, the memory 106 may comprise different memory technologies, including, for example, dynamic random access memory (DRAM).

The key modules 108 may comprise suitable logic, circuitry, and/or code that may be controlled, managed, and/or utilized during shut down and/or power on operations in the system 100. For example, the managed entities 106 may comprise an operating system (OS), a Basic Input/Output System (BIOS), a chipset, one or more sensors and/or devices that may reside within the system 100.

In operation, the main CPU 102 may perform various processing operations including, but not limited to, processing data, performing code instructions, and/or initiating, controlling, and/or supporting various applications in the system 100. The main CPU 102 may also enable performing control of various subsystems within the system 100, including, for example, the security processor 104, the memory 106, and/or the key modules 108. The key modules 108 may be utilized during various operations that may be performed via the system 100 including various software and/or hardware applications. The memory 106 may enable storage and/or retrieval of data and/or code that may be utilized, for example, by the main CPU 102, the security processor 104, and/or the key modules 108.

The security processor 104 may enable ensuring the overall security of the system 100 during general operability of the system 100 and/or during specific conditions and/or applications. For example, the system 100 may be enabled to perform various power saving operations. Power conservation has become a critical consideration in system designs, both for environmental and cost reasons. Modern systems, for example system 100, may need to utilize power savings techniques, both to conserve power within the system itself, in interacting external to the system. Power saving techniques may involve shutting down clocks, which may be utilized with the systems. However, modern systems, for example STBs, also tend to have stringent security requirements, including an on-chip security engine which must monitor the system and ensure security integrity. In such systems, stopping clocks to various system components can present a security concern because. In an embodiment of the invention, the security processor 104 may be enabled to perform secure management operations wherein the system 100, and/or subsystems and/or components within the system 100, may be shut down during non-use and/or limited use periods. Consequently, the security processor 104 may ensure that such shut down are securely performed and/or that the overall security of the system 100 may be maintained during such shut down periods. The security processor 104 may also enable shutting down clock signaling of the security processor 104 where such clock signaling shut down does not compromise the security of the system 100. Consequently, It may be critical to ensure, via the security processor 104, that conditions indicating potentially security breaches are strictly monitored and counteracted.

Figure 2:
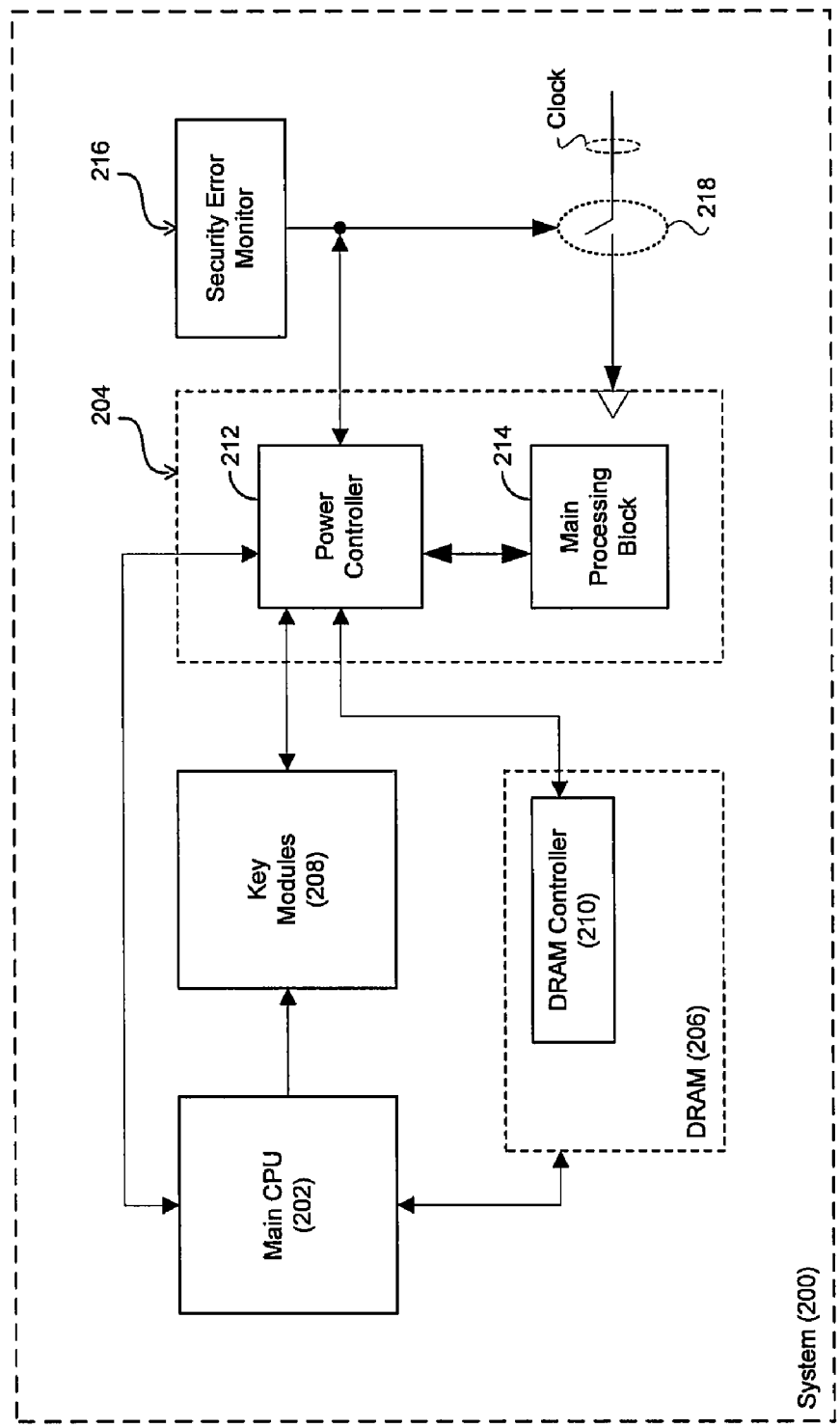
FIG. 2 is a block diagram illustrating an exemplary system that comprises a security processor that utilizes secure power management scheme to enable secure clock shut down in the system, in accordance with an embodiment of the invention.

FIG. 2 is a block diagram illustrating an exemplary system that comprises a security processor that utilizes secure power management scheme to enable secure clock shut down in the system, in accordance with an embodiment of the invention. Referring to FIG. 2, there is shown a system 200, a main Central Processing Unit (main CPU) 202, a security processor 204, key modules 206, a DRAM 206, a DRAM controller 210, a power controller 212, a main security processing block 214, a security error monitor 216, and a clock-switch 218.

The system 200 may comprise the main CPU 202, the security processor 204, the key modules 206, the DRAM 206, the security error monitor 216, and the clock-switch 218. The system 200 may also comprise suitable logic, circuitry, and/or code that may enable performing various operations, which may comprise data manipulation and/or storage, calculations, enabling inputting and/or outputting of various types of data, and/or performing applications or programs. The system 200 may be substantially similar to the system 100, as described in FIG. 1; and may comprise, for example, a general-purpose computer such as a desktop, a laptop, and/or workstation. Alternatively, the system 200 may comprise a special-purpose computer system that may be optimized for performing a specific type of functionality, for example, a digital television (DTV) set-top box (STB) system-on-chip (SOC). The system 200 may also be enabled to utilized secure power management scheme during shut down and/or power on operations.

The key modules 208 may be comprised substantially similar to the key modules 108, as described in FIG. 1, and may comprise suitable logic, circuitry, and/or code that may be enabled to be controlled, managed, and/or utilized during shut down and/or power on operations in the system 200. For example, the managed entities 106 may comprise an operating system (OS), a Basic Input/Output System (BIOS), a chipset, one or more sensors and/or devices that may reside within the system 100.

The DRAM 206 may comprise suitable logic, circuitry, and/or code that may enable direct random access memory operations, including storage and/or retrieval of data and/or code, which may be utilized by various subsystems and/or components in the system 200. The DRAM controller 210 may comprise suitable logic, circuitry, and/or code that may enable controlling and/or managing access to the DRAM 206, via the system 200. While the DRAM 206 is shown internal to the system 200, the DRAM 206 may alternatively be external to the system 200.

The security processor 204 may comprise the power controller 212, the main security processing block 214, and suitable logic, circuitry, and/or code that may enable performing various security operations, substantially similar to the security processor 104 as described with respect to FIG. 1. The security processor 204 may be operable to enable monitoring of the system 200 for possible security breaches, performing necessary security checks, and/or performing necessary encryption and/or decryption on communication transmitted and/or received via the system 200. The security processor 204 may also be enabled to perform control and/or management tasks to enable secure power management during shut down and/or power on in the system 200. The main security processing block 214 may comprise suitable logic, circuitry, and/or code that may enable performing security related processing operations via the security processor 204, during general operability of the system 200. The power controller 212 may comprise suitable logic, circuitry, and/or code that may enable performing necessary control and/or management tasks of the security processor 204 and/or other subsystems and/or components in the system 200 during shut down and/or power on in the system 200.

The security error monitor 216 may comprise suitable logic, circuitry, and/or code that may enable monitoring potential security breach(es) during shut down periods, when the clock to the security processor 204 may have been stopped. The clock-switch 218 may comprise suitable logic, circuitry, and/or code that may enable switching on and off a clock that may be utilize in clocking security processor 204.

In operation, the system 200 may be utilized to perform various operations, for example as a STB. The main CPU 202, the DRAM 206, and/or the key modules 208 may be utilized, for example, to perform various software and/or hardware based tasks during operability of the system 200. The main CPU 202 may perform various processing operations comprising, for example, processing data, performing code instructions, and/or controlling and/or managing various applications and/or subsystems in the system 200, including, for example, the security processor 204, the DRAM 206, and/or the key modules 208. The key modules 208 may be utilized during various operations that may be performed via the system 200 including various software and/or hardware tasks. The DRAM 206 may be utilized to facilitate direct storage and/or retrieval of data and/or code during operations of the system 200, and may be utilized, for example, by the main CPU 202, the security processor 204, and/or the key modules 208. The security processor 204 may be utilized via the system 200 to enable ensuring overall security within the system 200. For example, the security processor 204 may be utilized to monitor overall security in the system 200, to detect and/or remedy possible security breaches, and/or to perform necessary security based encryption and/or decryption in the system 200.

In an exemplary embodiment of the invention, various power saving techniques may be incorporated via the system 200 to enable power conservation during periods when there is no-use and/or limited use of the system 200. Power conservation technique may comprise, for example, shutting down of various components and/or subsystems in the system 200, comprising, for example, the main processor 202, the security processor 204, and/or the key modules 208, which may be achieved, for example, by stopping and/or slowing down of clocking of such components and/or subsystems. In such exemplary scenarios, the system 200 may be exposed to security threats if the shutting down was not performed securely. For example, a shut down may be performed by enabling the main CPU 202 in the system 200 to shut down all the components and/or subsystems in the system 200, including the main CPU 202 to enable the system 200 to go into hibernation-like state. Such approach, however, may expose the system 200 to, for example, 'glitching' attacks, wherein an attacker may gain control of the system 200 after the security processor 204 is shut down but before remaining components, including the main CPU 202 and/or the key modules 208 are property shut down. Furthermore, in such a system, compromised code on the main CPU 202 may initiate system clock stop, but may then halt the operation after the security processor 204 has already accepted the clock stop command and stopped its own clock. Such a breach may allow the main CPU to continue to operate in the absence of system processor 204 monitoring. Also, since the security processor 204 may be checking the DRAM 206 for breaches, and since the clock of the DRAM 206 may become stopped, it is necessary for the security processor to halt such operations before the clock is stopped. However, if the main CPU 202 is allowed to command the security processor 204 when to stop operations, compromised code could later use this ability in a malicious manner.

The security processor 204 may be utilized to ensure secure shut down and/or power on of the system 200. For example, control and/or management of the shut down may be performed via the security processor 204 to ensure that system 200 may not be exposed to potential security threats during shut downs. The security processor 204 may retain ultimate control of its own clocking and/or the exact timing of when/how to stop clocking of the security processor 204 to ensure that stopping clocking of the security processor 204 may not be allowed until it is safe to do so. The main CPU 202 may initiate the shut down by sending a shut down request to the power control 212 in the security processor 204. The power controller 212 may then process the request and perform necessary steps to ensure that none of the critical subsystems and/or components is exposed to security threats during the shut down. For example, the power controller 212 may communicate with the main security processing block 214 to ensure that ongoing security operations are concluded before the shut down is complete and/or to ensure continued monitoring of security of the system 200 during the shut down. The power controller 212 may then communicate with the key modules 208 to ensure that ceasing clocking and/or access of the key modules 208, especially those that may not be brought up again without the security processor 204, is completed before the security processor 204 is shut down.

The power controller 212 may also be utilized to ensure proper shut down of the DRAM before the security processor 204 is itself shut down. For example, the power controller 212 may communicate with the DRAM controller 210 to shut down the DRAM 206 and to ensure that all access to the DRAM 206, by the main CPU 202 for example, is prevented before the security processor 204 is itself shut down. The power controller 212 may also continue to communicate with the main CPU 202 to ensure that main CPU 202 is not itself exposed to security threats during shut down of the system 200 and/or the security processor 204. Once the power controller 212 determines that all components and/or subsystems that may be susceptible to security breaches are shut down and/or are protected from potential security threats, the power controller 212 may cause completion of the shut down of the security system 204 itself. For example, the power controller 212 may communicate with the clock-switch 218 to cause stopping of the clock to the security processor 204.

In an embodiment of the invention, the security error monitor 216 may be utilized to enable continued minimal monitoring of the security of the system 200 during shut down periods. For example, the security error monitor 216 may remain active during system shut down periods, and may enable continued monitoring of any potential security threats that may occur during the shut down periods and/or activities that may indicate a potential security breach during power on subsequent to the shut down. In instances where a threat is detected, the security error monitor 216, directly and/or via the power controller 212, may be enabled to awake the security processor 204 by activating the clock, via clock-switch 218. Once awakened, the security processor 204 may, via the main security processing block 214, for example, determine whether the perceived threat is real or not. The security processor 204 may consequently determine whether the system 200 may be powered on or remain in its current state. In instances where the system 200 is to be powered on, the security processor 204 may enable, via the main security processing block 214, for example, secure power on of relevant components and/or subsystems in the system 200, including, for example, the main CPU 202, the key modules 208, and/or the DRAM 206.

Figure 3A:
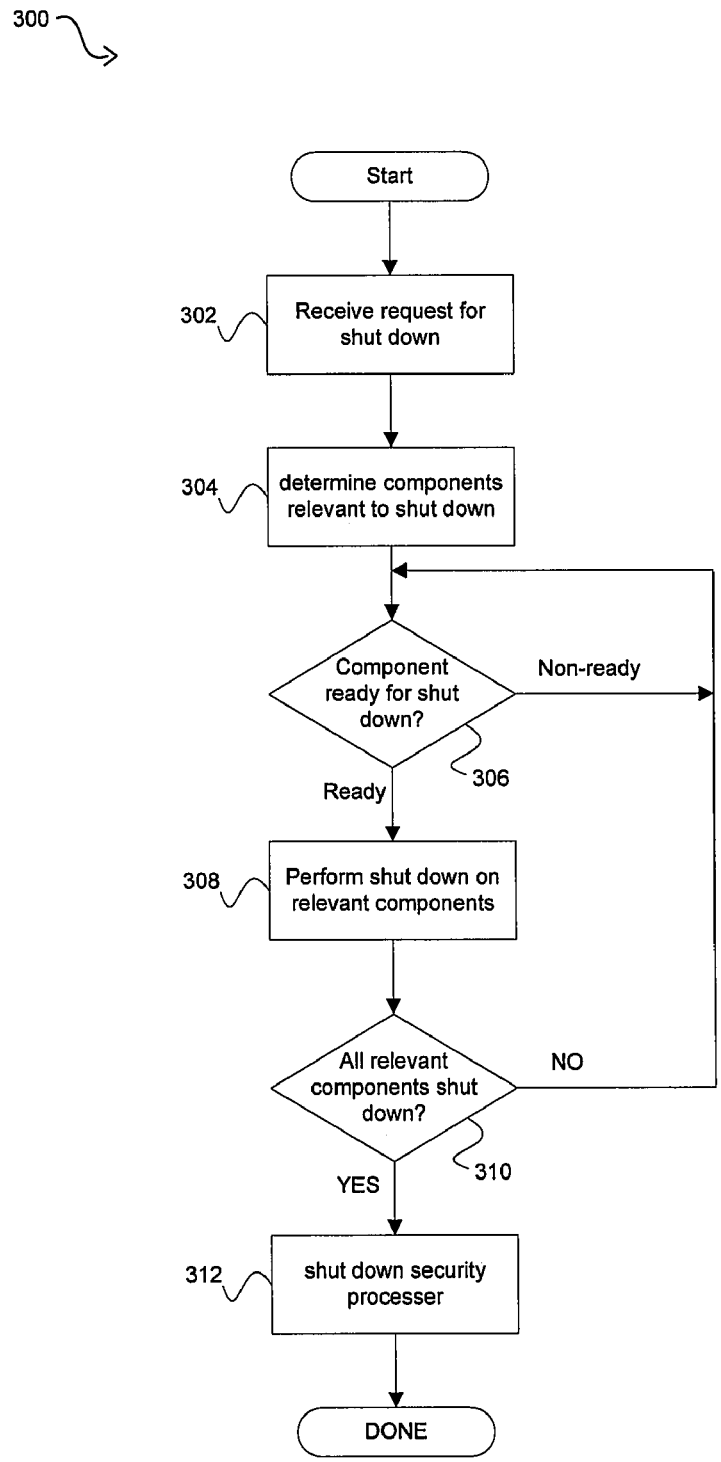
FIG. 3A is a flow diagram illustrating exemplary steps for secure power management via a security processor to enable secure shut down in a system, in accordance with an embodiment of the invention.

FIG. 3A is a flow diagram illustrating exemplary steps for secure power management via a security processor to enable secure shut down in a system, in accordance with an embodiment of the invention. Referring to FIG. 3A, there is shown a flow chart 300 comprising a plurality of exemplary steps, which may enable, performing secure shut down in a system.

In step 302, a shut down request may be received by a security processor in a system. For example, the security processor 204 may receive a shut down request, which may be sent via the main CPU 202 in the system 200. In step 304, a determination of the components and/or subsystem relevant to the requested shut down may be performed. For example, the security processor 204 may determine, once it receives a shut down request, which components and/or subsystems in the system 200 may need be shut down to effectuate the requested system shut down. The relevant components, in the system 200 for example, may comprise the main CPU 202, the key modules 208, and/or the DRAM 206. The relevant components, as determined in step 304, may need be shut down prior to shutting down the security processor itself, to ensure that the system may not be exposed to security threats and/or breaches during the security processor shut down periods.

In step 306, it may be determined whether one of the relevant components, which may still need to be shut down, is ready to be shut down. For example, the security processor 204 may communicate with the main CPU 202 to indicate that one or more of the key modules 208, and/or the DRAM 206 may be ready to be shut down. A relevant component may not be ready for shut down when it may be in the midst of performing a previously requested and/or scheduled task that may not be interrupted and/or terminated unfinished, for example. In instances where the relevant component may not be ready for shut down, the exemplary steps may loop back to step 306.

Returning to step 306, in instances where the relevant component may be ready for shut down, the exemplary steps may proceed to step 308. In step 308, the shut down of relevant component(s) determined to be ready for shut down may be performed. For example, in instances where the security processor 204 may determine that the DRAM 208 is ready for shut down, the security processor 204 may shut down the DRAM 208 by, for example, communicating with the DRAM controller 210 to disable access to the DRAM 208 by other components and/or subsystems in the system 200. In step 310, it may be determined whether all the relevant components, as determined in step 304, have been shut down. For example, the security processor 204 may determine whether all of the main CPU 202, the key modules 208, and the DRAM 206, which may have been determined relevant to the shut down, where shut down. The determination that relevant components are shut down may also comprise ensuring that secure shut down conditions that are specific to unique components are also met. For example, the security processor 204 may enforce main CPU 202 shutdown. Enforcing the main CPU 202 shut down may comprise, for example, ensuring that the shutting down of the clocking of the main CPU 202 is unrecoverable in the absence of the security processor 204. This may be needed because otherwise even though the main CPU 202 has shutdown its own clock, it may be able to recover, via timer based interrupt for example, before the main clock is stopped. Enforcing the shut down of the main CPU 202 may be perform via separate entity controlled by the security processor 204, which guarantees that malicious code in the main CPU 202 cannot attempt to re-awaken the main CPU 202 without waking up the security processor 204 as well. In instances where all relevant components were not shut down, the exemplary steps may be step 306.

Returning to step 310, in instances where all the relevant components have been shut down, the exemplary steps may proceed to step 312. In step 312, shut down of security processor itself may be performed. For example, in the system 200, once the security processor 204 determines that all relevant components have been shut down, the security processor 204 may then enforce that the main CPU 202 clock cannot be restarted without a system wakeup, an it may then itself be shut down by, for example, stopping clocking of the security processor 204 via the clock-switch 218.

Figure 3B:
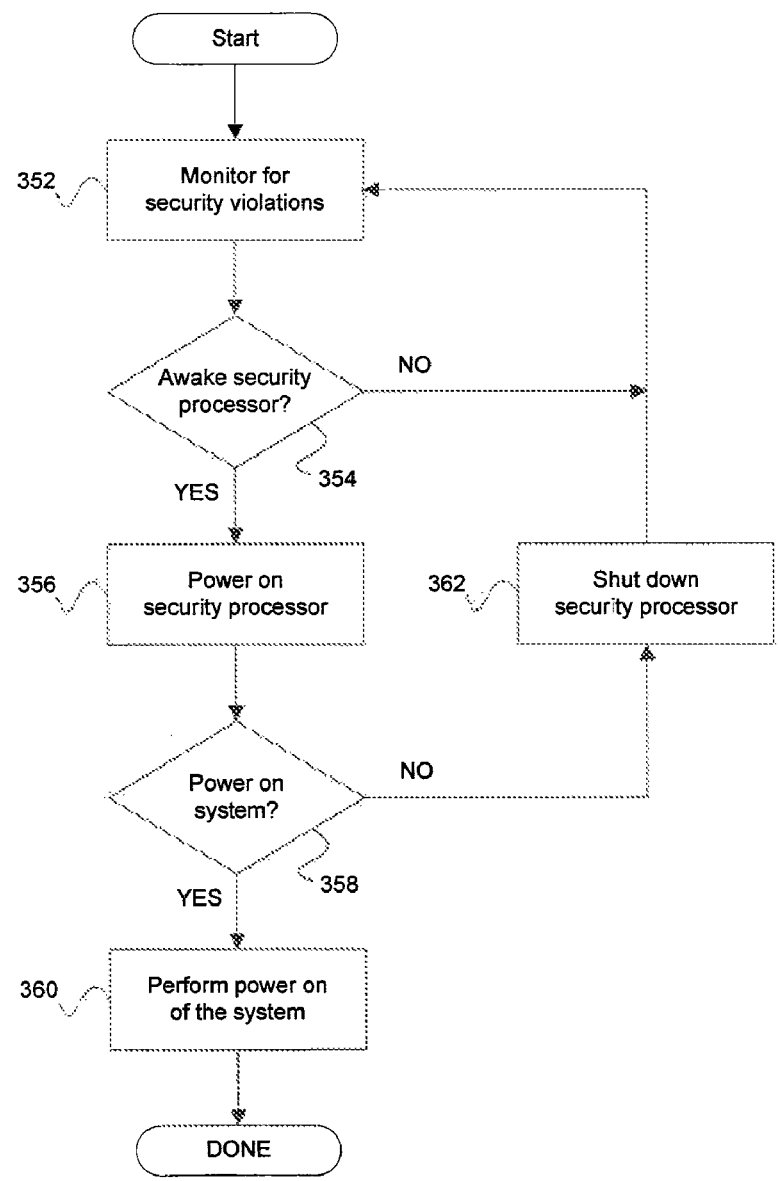
FIG. 3B is a flow diagram illustrating exemplary steps for secure power management during system shut down, in accordance with an embodiment of the invention.

FIG. 3B is a flow diagram illustrating exemplary steps for secure power management during system shut down, in accordance with an embodiment of the invention. Referring to FIG. 3B, there is shown a flow chart 350 comprising a plurality of exemplary steps, which may enable management of system during secure shut down.

In step 352, a system may be monitored for security threats and/or breaches during shut down. For example, in the system 200, the security error monitor 216 may remain active during system shut down periods, and may enable continued monitoring of any potential security threats that may occur during the shut down periods. The security error monitor 216 may continue to monitor for any activity that may indicate a potential security breach during power on subsequent to the shut down. In step 354, a determination whether to awake a shut down security processor may be performed when potential security threats and/or breaches are detected. For example, in instances where potential security threats and/or breaches may be detected via the security error monitor 216, a determination whether to awake the shut down security processor 204 may be performed. The security error monitor 216 may be programmed, for example, to perform minimal security checks and/or remedies during shut down periods. In instances where it may be determined that the security processor need not be awakened, the next exemplary step may be step 352.

Returning to step 354, where it may be determined that the security processor need be awakened, the exemplary steps may loop back to step 356. In step 366, a shut down security processor may be powered on. For example, in the system 200, the shut down security processor 204 may be powered on once it is determined, via the security error monitor 216 for example, that it may be necessary to do so. The security error monitor 216, directly and/or via the power controller 212, may be enabled to power on the security processor 204 by activating the security processor clock, via clock-switch 218. In step 358, a powered on security processor may determine whether a shut down system may be powered back on. For example, in the system 200, once the security processor 204 is power on back during shut down period, a determination whether to power on the system 200 itself may be performed. The determination may be based, for example, on analysis of the security breach and/or based on determination that the system 200 may need to be utilized securely in performing one or more requested tasks. In instances where it may be determined that the system need be powered on, the exemplary steps may proceed to step 360. In step 360, the shut down system may be power on. For example, the shut down system 200 may be powered on once the security processor 204 determines that the system 200 may need to be powered on. The security processor 204 may enable, via the main security processing block 214 for example, secure power on of relevant components and/or subsystems in the system 200, including, for example, the main CPU 202, the key modules 208, and/or the DRAM 206.

Returning to step 358, in instances where it may be determined that the system need not be powered on, the exemplary steps may proceed to step 362. In step 362, the security processor may be shut down. For example, in the system 200, once the security processor 204 determines that the system 200 need not be powered on, and that the shut down period may be continued, the security processor 204 may itself be shut down by, for example, stopping clocking of the security processor 204 via the clock-switch 218. The exemplary steps may then loop back to step 352, to enable continuing system monitoring during the system shut down.

Various embodiments of the invention may comprise a method and system for a secure power management scheme. The security processor 204 may be securely shut down in the system 200 so that system security is not compromised. The security processor 204 may receive a shut down request, and may determine components and/or subsystems in the system 200 that need be shut down during the security processor shut down periods. The security processor 204 may determine when each of the relevant components is ready for shut down, and those ready components and/or subsystems may be shut down. Once the relevant components are shut down, the security processor 204 may itself be shut down, wherein the shut down of the security processor 204 may be performed by stopping the clocking of the security processor 204, via the clock-switch 218 for example. The security error monitor 216 may enable monitoring the system 200 during shut down periods, and the security processor 204 may be powered back on, when security breaches and/or threats may be detected via the security error monitor 216. The security error monitor 216, directly and/or via the power controller 212, may be enabled to power on the security processor 204 by activating the security processor 204 clock, via clock-switch 218.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a secure power management scheme.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for managing a system including a central processing unit (CPU), a secure processor, and one or more system components, the method comprising:
   receiving, at the secure processor, a request from the CPU to shut down the system;
   determining, at the secure processor, a first set of the system components to be shut down prior to shutting down the secure processor;
   initiate shutting down the first set of the system components and the CPU;
   securely managing a shut down of the secure processor once the first set of the system components and the CPU have finished shutting down, wherein the secure managing of the shut down of the secure processor comprises ensuring that security of the secure processor is not compromised during the shut down of the secure processor;
   monitoring, using a security error monitor, the system for security breaches while the secure processor is shut down;
   detecting a potential security breach;
   waking up the secure processor responsive to detecting the potential security breach;
   analyzing, at the secure processor, the potential security breach; and
   determining, responsive to analyzing the potential security breach, whether to wake up the CPU.

2. The method according to claim 1, further comprising validating the request to shut down the system, by the secure processor, based on monitoring clocking and/or control signals supplied to the secure processor and/or the one or more system components.

3. The method according to claim 1, further comprising blocking access to one or more of the system components, via the secure processor, during the shut down of the system.

4. The method according to claim 1, further comprising unblocking access to the one or more system components, via the secure processor, during power up of the system.

5. The method according to claim 1, further comprising verifying cessation of access to memory prior to a completion of the shut down of the system.

6. The method according to claim 1, further comprising utilizing a predetermined shutdown sequence, monitored via the secure processor, of at least some of the system components.

7. The method of claim 1, further comprising:
   sending, from the secure processor, a message to the CPU inquiring whether the first set of the system components are ready to be shut down; and receiving, at the secure processor, information from the CPU indicating whether the first set of the system components are ready to be shut down.

8. The method of claim 1, wherein determining the first set of the system components comprises determining which of the one or more system components are susceptible to an attack by a third party once the secure processor has been shut down.

9. The method of claim 1, wherein shutting down the CPU comprises:
   shutting down a clock in communication with the CPU; and
   ensuring that the clock cannot be restarted without alerting the secure processor.

10. A system for device management, the system comprising:
   a central processing unit (CPU) configured to initiate a request to shut down the system;
   one or more system components coupled to the CPU;
   a secure processor coupled to the CPU and the system components, wherein the secure processor is configured to:
      receive the request to shut down the system,
      determine a first set of the system components to be shut down prior to shutting down the secure processor,
      initiate shutting down the first set of the system components and the CPU,
      securely manage a shut down of the secure processor once the first set of the system components and the CPU have finished shutting down, wherein the secure managing of the shut down of the secure processor comprises ensuring that security of the secure processor is not compromised during the shut down of the secure processor,
      analyze a potential security breach, and
      determine, responsive to analyzing the potential security breach, whether to wake up the CPU; and
   a security error monitor configured to:
      monitor the system for security while the secure processor is shut down,
      detect the potential security breach, and
      wake up the secure processor responsive to detecting the potential security breach.

11. The system according to claim 10, wherein the secure processor is further configured to validate the request to shut down the system based on monitoring of clocking and/or control signals supplied to the secure processor and/or the one or more system components.

12. The system according to claim 10, wherein the secure processor is further configured to block access to one or more of the system components during the shut down of the system.

13. The system according to claim 10, wherein the secure processor is further configured to enable verification of a cessation of access to memory prior to a completion of the shut down of the system.

14. The system according to claim 10, wherein the secure processor is further configured to utilize a predetermined shutdown sequence at least some of the system components during the shut down of the system.

15. The system of claim 10, wherein the secure processor is further configured to:
   send a message to the CPU inquiring whether the first set of the system components are ready to be shut down; and
   receive information from the CPU indicating whether the first set of the system components are ready to be shut down.

16. The system of claim 10, wherein the secure processor is configured to determine the first set of the system components by determining which of the first set of the system components are susceptible to an attack by a third party once the secure processor has been shut down.

17. The system of claim 10, wherein the secure processor is configured to initiate shutting down the CPU by:
   initiating a shut down of a clock in communication with the CPU; and
   ensuring that the clock in communication with the CPU cannot be restarted without alerting the secure processor.

18. A system for device management, the system comprising:
   a central processing unit (CPU) configured to initiate a request to shut down the system;
   a key module coupled to the CPU;
   a memory coupled to the CPU;
   a secure processor coupled to the CPU, the key module, and the memory, wherein the secure processor is configured to:
      receive the request to shut down the system,
      initiate shutting down the key module, the memory, and the CPU, and
      securely manage a shut down of the secure processor once the key module, the memory, and the CPU have finished shutting down;
      analyze a potential security breach, and
      determine, responsive to analyzing the potential security breach, whether to wake up the CPU; and
   a security error monitor configured to:
      monitor the system for security breaches while the secure processor is shut down,
      detect the potential security breach, and
      wake up the secure processor responsive to detecting the potential security breach.

19. The system of claim 18, wherein the secure processor is further configured to:
   send a message to the CPU inquiring whether the key module and the memory are ready to be shut down; and
   receive information from the CPU indicating whether the key module and the memory are ready to be shut down.

* * * * *

UNITED STATES PATENT AND TRADEMARK OFFICE
CERTIFICATE OF CORRECTION

PATENT NO. : 8,365,308 B2
APPLICATION NO. : 12/248146
DATED : January 29, 2013
INVENTOR(S) : Rodgers et al.

Page 1 of 1

It is certified that error appears in the above-identified patent and that said Letters Patent is hereby corrected as shown below:

In the Specifications

In column 11, line 39, please replace "for security" with -- for security breaches --.

Signed and Sealed this
Fourteenth Day of May, 2013

Teresa Stanek Rea
*Acting Director of the United States Patent and Trademark Office*